Figure 1:
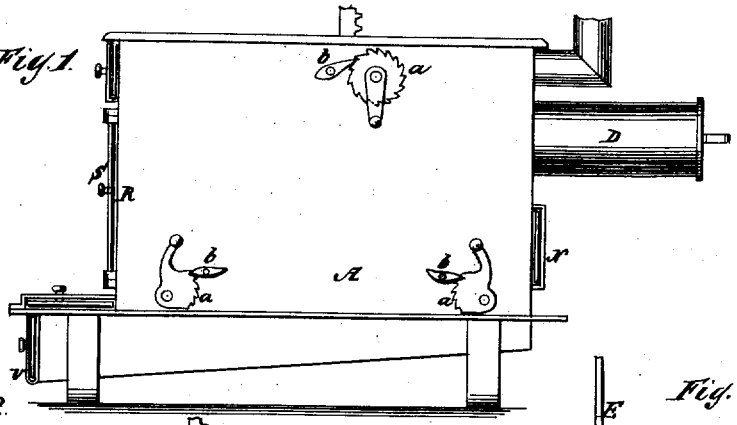

A. HAMILTON.

Stove.

No. 6,500. Reissued June 22, 1875.

WITNESSES:

E. Wolff

Alex. F. Roberts

INVENTOR:

A. Hamilton

BY

Munn & Co.

ATTORNEYS.

THE GRAPHIC CO. PHOTO-LITH. 39 & 41 PARK PLACE, N.Y.

UNITED STATES PATENT OFFICE.

ALEXANDER HAMILTON, OF CRESCO, IOWA, ASSIGNOR OF ONE-HALF INTEREST TO AUG. BEADLE AND BENJAMIN HUNTTING.

IMPROVEMENT IN STOVES.

Specification forming part of Letters Patent No. 156,730, dated November 10, 1874; reissue No. 6,500, dated June 22, 1875; application filed May 24, 1875.

*To all whom it may concern:*

Be it known that I, ALEXANDER HAMILTON, of Cresco, in the county of Howard and State of Iowa, have invented a new and Improved Method of Burning Hay, Straw, &c., for Fuel, of which the following is a specification:

My invention consists of utilizing hay, straw, leaves, and other vegetable substances for fuel by burning them while subject to condensation under pressure, the pressure being to pack the loose fuel of this character in a dense mass and cause it to burn more slowly in certain parts at the edges, some or all of which are exposed in suitable spaces for combustion. By preference the pressure will be applied at the top of the mass downward by a follower, allowing a little space for combustion all round, so that the fuel will burn directly against the sides of the fire-box, to give out the heat directly into the room. I have found by practical experiment that fuel of this character, so burned, gives intense heat and burns long enough to compete favorably with wood and coal in point of expense for culinary and heating purposes, and in some respects it is more easily and conveniently prepared and handled.

Straw, hay, and leaves in their natural state cannot properly be called fuel with any more propriety than paper, cotton, or gunpowder. From their extreme porous, light, fibrous, and elastic nature, igniting at a low temperature—say, 500°—they give such free access for oxygen to every part of their mass in burning that the carbon is almost immediately saturated, and their combustion partakes almost of the nature of explosion.

Now, I have made a new and useful discovery, viz., that if such material be properly compacted and compressed, and so kept during combustion, the pores, fibers, and elasticity of the mass are so modified that the too free access of oxygen is prevented and the supply is so regulated that a pound of carbon in such form may be made to yield as much heat, as regularly and availably, as can the carbon contained in a pound of wood or coal.

This I consider to be new, as I do not know that any material has been burned under a continuous pressure to prevent the access of oxygen; and it is as useful, as it makes available for fuel thousands of tons of material of which no use can now be made, and that, too, in countries where coal or wood are scarcely to be had.

Coal requires a high temperature to ignite it—say, 1,000° or 1,200°. It will not burn in small masses, nor in large without abundant supply of oxygen to saturate not only its carbon, but also the large quantity of hydrogen which it contains, and pressure applied to burning coal is only useful in keeping it massed and forcing out the accumulating ashes which obstruct the draft, and any further pressure that compacts the mass, shuts off the air, and extinguishes the fire. Coal and wood are practical fuel because the methods of using them are known, but hay, straw, leaves, &c., are not such until they become so by some appliances not heretofore generally known, and such appliances I have discovered.

Figure 2:
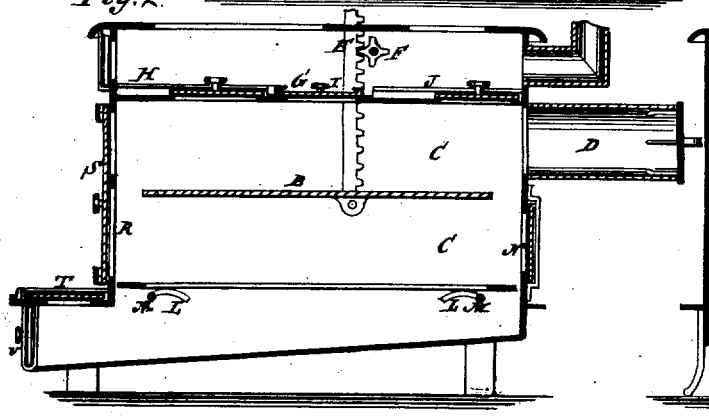
Figure 3:
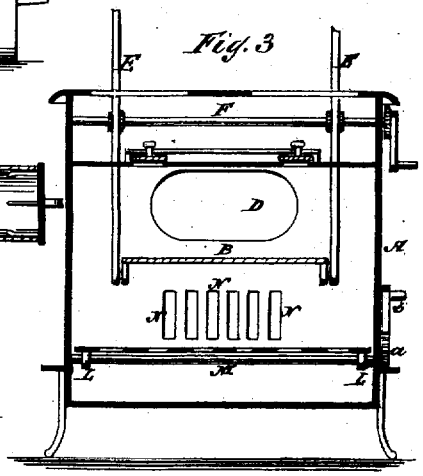
Figure 4:
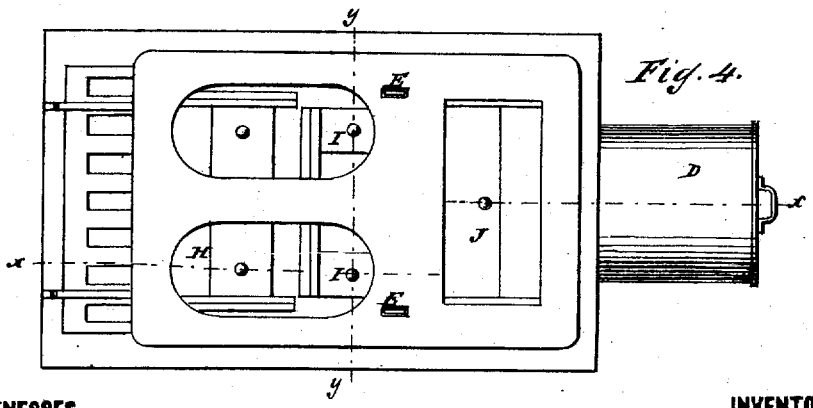

Figure 1 is a side elevation of a cooking and heating stove provided with means, according to one plan, that may be adopted for carrying out my invention. Fig. 2 is a sectional elevation taken on the line *x x* of Fig. 4. Fig. 3 is a sectional elevation taken on the line *y y* of Fig. 4; and Fig. 4 is a plan view.

Similar letters of reference indicate corresponding parts.

A represents a box-stove, preferably of sheet-iron, in which is a press-follower, B, adapted to be raised up to the top of the fire-chamber C and receive fuel of hay, straw, and the like, under it—say, from a tubular feeder, D—and then be forced down on the fuel to press it into a dense mass. In this case the follower is provided with toothed bars E extending up through the top of the stove and gearing with a cranked shaft, F, for working it, but it may be worked by a screw or any other approved means. The feeder may extend out through the side of the house, or through a partition, into a room in which the fuel is stored. G represents a partition over the fire-chamber and below the top plate, with dampers H, I, and J, for causing the heat to pass up through different parts, as may be required. K is the bottom grate, which is contrived so as to rise and fall, and provided with arms L and rock-shafts M for operating it, the object being to adjust it, relatively to the follower according to the quantity of fuel required between them. N is an opening for draft with a register, the opening being traversed by bars or gratings, to prevent the hay from being pressed out. Gratings are also employed in the front openings R, to prevent the fuel from being pressed out when the doors S are opened. T and U are draft-openings with dampers in the top and side of the hearth for draft and for taking out the ashes. The shafts F and M for raising and lowering the follower and the grate have a ratchet and pawl upon the outside of the stove *a b*, to hold them at any required point.

The process which this apparatus is intended to carry out is the subject of a separate application.

What I now claim is—

The combination, with the fire-chamber C and vertically-adjustable grate K, of the press-follower B rising to the top of said chamber, to receive the fuel thereunder, and operate as and for the purpose described.

ALEXANDER HAMILTON.

Witnesses:

H. T. REED,

A. E. ANDERSON.